(No Model.)

W. H. WIND.
EDUCATIONAL APPLIANCE.

No. 472,419. Patented Apr. 5, 1892.

Witnesses:
R. Schleicher
A. V. Groups

Inventor:
William H. Wind
by his Attorneys
Howson & Howson

UNITED STATES PATENT OFFICE.

WILLIAM H. WIND, OF PHILADELPHIA, PENNSYLVANIA.

EDUCATIONAL APPLIANCE.

SPECIFICATION forming part of Letters Patent No. 472,419, dated April 5, 1892.

Application filed October 26, 1891. Serial No. 409,850. (No model.)

*To all whom it may concern:*

Be it known that I, WILLIAM H. WIND, a citizen of the United States, and a resident of Philadelphia, Pennsylvania, have invented certain Improvements in Educational Appliances, of which the following is a specification.

The object of my invention is to provide an educational appliance which will serve as an efficient aid in teaching the alphabet and the spelling of words; and this object I attain in the manner hereinafter set forth, reference being had to the accompanying drawings, in which—

Figure 1:
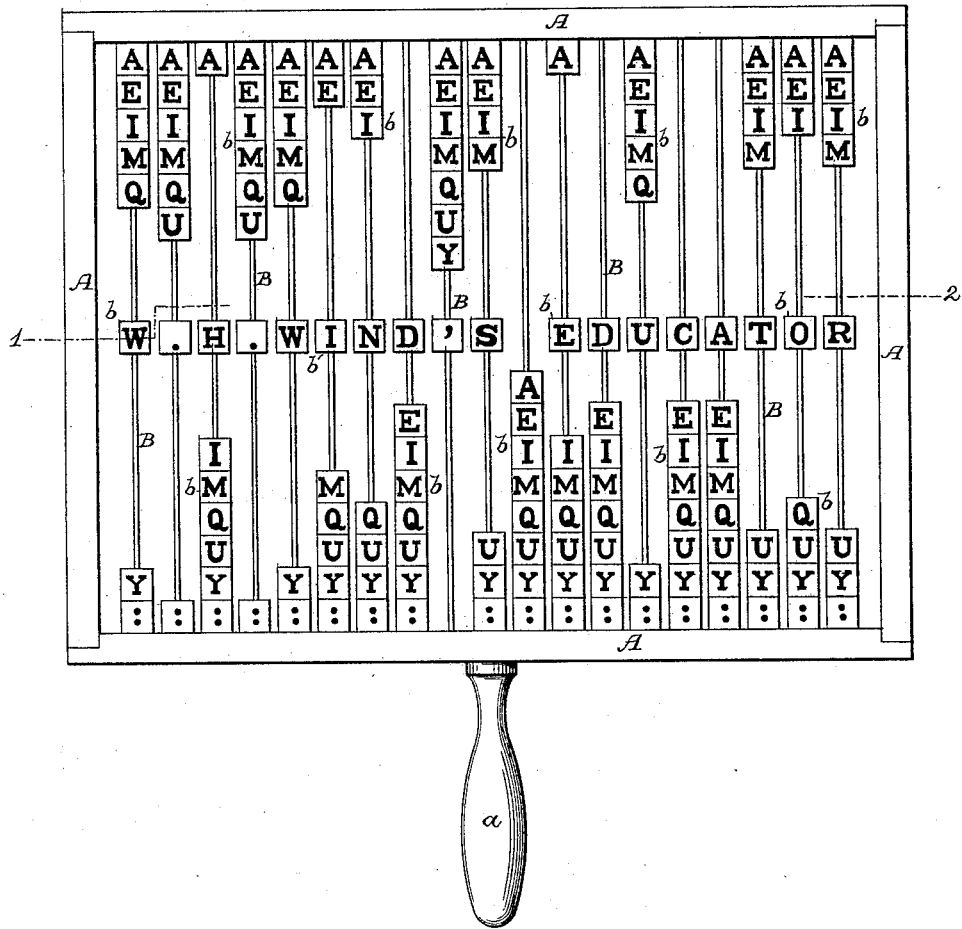
Figure 2:
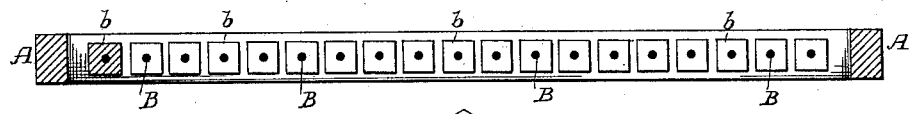
Figure 3:
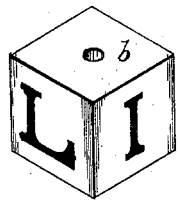

Figure 1 is a front view of my improved educational appliance. Fig. 2 is a sectional plan view on the line 1 2, Fig. 1; and Fig. 3 is a perspective view, on an enlarged scale, of one of the letter-blocks of the device.

A is a rectangular frame of any appropriate material, and if the device is of small size to be held in the hand this frame is preferably provided with a handle $a$; but if the frame is of larger size it may be mounted in any suitable way upon a desk or table or upon the wall of the school-room. Between the top and bottom bars of the frame extend a series of rods B, circular in cross-section, and upon each of these rods is mounted a series of cubical blocks $b$, each block having upon four of its sides letters of the alphabet, and each series of blocks comprising at least seven blocks, so as to contain all of the letters of the alphabet, each series having also, by preference, one or more additional blocks containing the punctuation-marks most commonly used. Thus in the device shown in the drawings there are eight blocks in each series, the first block containing the letters "A B C D," the second block containing the letters "E F G H," and so on, the seventh block containing the letters "Y" and "Z," the representation "&," and a representation of a period, while the eighth block contains the representation of a comma, a semicolon, a colon, and an apostrophe.

The length of each of the rods B is at least twice the length of the space occupied by the series of blocks, and while each block can slide and be turned on its guide-rod it is preferably fitted so snugly to said rod that it will retain the position to which it is adjusted. It will therefore be seen that any desired word or sentence containing a number of letters or punctuation-marks within the limit of the device can be readily formed upon the central portions of the rods B by moving the blocks $b$ upon said rods until the blocks containing the desired letters or punctuation-marks are strung in line upon the central portions of the rods, as shown in the drawings.

If desired, the device may be provided with additional rods carrying blocks having numerals marked thereon, so as to build up numbers as well as words by stringing the desired blocks into line at the central portions of the rods.

Having thus described my invention, I claim and desire to secure by Letters Patent—

The within-described educational device, consisting of a frame having a series of guide-rods with blocks mounted on said rods and free both to slide and to turn thereon, each block having letters upon four of its sides and each series of blocks carrying the letters of the entire alphabet, each of the guide-rods being of a length equal to twice the space occupied by the series of blocks, so that any desired block of the series can be moved into a central position on its rod, substantially as specified.

In testimony whereof I have signed my name to this specification in the presence of two subscribing witnesses.

WILLIAM H. WIND.

Witnesses:
 JNO. E. PARKER,
 H. F. REARDON.